(12) United States Patent  
Kim

(10) Patent No.: US 6,715,631 B2  
(45) Date of Patent: Apr. 6, 2004

(54) POT WITH MULTI-LAYERED BOTTOM AND MANUFACTURING PROCESS THEREOF

(76) Inventor: Myung Suk Kim, 1343-16, Seocho-dong, Seocho-ku, Seoul 137-060 (KR)

( * ) Notice: Subject to any disclaimer, the term of this patent is extended or adjusted under 35 U.S.C. 154(b) by 68 days.

(21) Appl. No.: 10/146,174

(22) Filed: May 15, 2002

(65) Prior Publication Data

US 2003/0160053 A1 Aug. 28, 2003

(30) Foreign Application Priority Data

Feb. 26, 2002 (KR) ......................................... 2002-10255

(51) Int. Cl.[7] .................................................. B65D 6/28
(52) U.S. Cl. ..................... 220/573.1; 220/620; 220/912
(58) Field of Search ............................ 220/573.1, 626, 220/627, 912

(56) References Cited

U.S. PATENT DOCUMENTS

| | | | | |
|---|---|---|---|---|
| 4,350,289 A | * | 9/1982 | Shimada et al. | ........ 237/12.3 A |
| 4,596,236 A | * | 6/1986 | Eide | ........................... 219/621 |
| 4,614,852 A | | 9/1986 | Matsushita et al. | |
| 4,917,076 A | * | 4/1990 | Nadolph et al. | ......... 126/375.1 |
| 5,064,055 A | * | 11/1991 | Bessenbach et al. | ........ 220/626 |
| 5,564,590 A | | 10/1996 | Kim | |
| 5,770,837 A | * | 6/1998 | Hatta et al. | .................. 219/621 |
| 5,952,112 A | * | 9/1999 | Spring | ......................... 428/653 |
| 6,360,423 B1 | * | 3/2002 | Groll | .......................... 29/527.2 |
| 6,631,824 B2 | * | 10/2003 | Park | ............................. 220/740 |

* cited by examiner

*Primary Examiner*—Joseph Man-Fu Moy  
(74) *Attorney, Agent, or Firm*—Seyfarth Shaw LLP

(57) ABSTRACT

The present invention relates to a pot with a multi-layered bottom and a manufacturing process thereof. More specifically, the pot with a multi-layered bottom made of a stack of different materials is characterized by: an upper aluminum plate being fixed to the base bottom in contact with each other; a perforated plate being fixed to the lower side of the upper aluminum plate and having a plurality of hollow portions; a lower aluminum plate being fixed to the lower side of the perforated plate; a stainless steel plate being fixed to the lower side of the lower aluminum plate and being magnetic; and the corresponding portions of the upper and lower aluminum plates are inserted into the hollow portions of the perforated plate by pressure and thus are interconnected in the hollow portions. In accordance with the present invention, by the multi-layered bottom, heat conductivity and heat efficiency are increased to cook foods in a short time, foods are not scorched and stuck, and the connection force between plates deposited on the lower sides of the base bottom becomes stronger, thereby improving the reliability of the product.

3 Claims, 5 Drawing Sheets

POT WITH MULTI-LAYERED BOTTOM AND MANUFACTURING PROCESS THEREOF

BACKGROUND OF THE INVENTION

1. Field of the Invention

The present invention relates to a pot with a multi-layered bottom and a manufacturing process thereof, and more particularly, to a pot with a multi-layered bottom which can cook foods uniformly in a short time with increased heat efficiency and heat conductivity and which is aesthetically pleasing and a manufacturing process thereof.

2. Description of the Related Art

Generally, cookware used for cooking foods is made of stainless steel. However, such conventional cookware is problematic in that its base bottom may be not uniformly heated and heat efficiency may be reduced. Thus, three-layered clad metal cookware has been proposed.

A clad metal is a composite plate material consisting of a stainless steel-clad aluminum plate, or an aluminum plate clad with a stainless steel plate, and also a material formed by integrating two or more different metal plates. It is used for kitchenware, motor parts, high speed subway and railway parts, aircraft materials, sound proof equipment materials, building materials, etc.

In the kitchenware art, the clad metal has a high degree of heat conductivity and heat conservativity due to the aluminum and a high degree of corrosion resistance due to the stainless steel, and it is aesthetically pleasing However, in using the cookware (hereinafter, 'clad metal cookware') with a three-layered bottom using the clad metal, a high degree of heat efficiency and heat conductivity is required for cooking food rapidly and heating it uniformly.

Due to this, a structure is considered in which the aluminum of the clad metal cookware is clad with copper which has a higher degree of heat conductivity than the aluminum. However, since the aluminum and the copper are nonferrous metal, it is difficult to clad them together the process of which will now be described in more detail.

Firstly, in a process of heating the clad metal cookware at a temperature slightly lower than the melting point of aluminum in order to clad the clad metal cookware with the aluminum, the copper, with a thickness less than the aluminum, melts earlier, so it is difficult to adjust preheating conditions.

In addition, in the heating process, an oxide coating is generated on the surface of the copper, thus reducing the adhesion force to the aluminum.

Meanwhile, because the base bottom of the conventional clad metal cookware is made of aluminum and stainless steel, the color of the product becomes a single, silver white color, thus making the product look relatively simple.

SUMMARY OF THE INVENTION

It is therefore, an object of the present invention to provide a pot with a multi-layered bottom which can cook foods in a short time with increased heat efficiency and heat conductivity by firmly cladding materials with high heat conductivity such as copper with aluminum and which has a pleasing appearance and a manufacturing process thereof.

To achieve the above object, there is provided a pot with a multi-layered bottom made of a stack of different materials in accordance with the present invention, characterized in that the pot A pot with a multi-layered bottom made of a stack of different materials, the pot comprises: an upper aluminum plate being fixed to the bottom of the pot in contact with each other; a perforated plate being fixed to the lower side of the upper aluminum plate and having a plurality of hollow portions; a lower aluminum plate being fixed to the lower side of the perforated plate; and a stainless steel plate being fixed to the lower side of the lower aluminum plate; wherein the upper aluminum plate and lower aluminum plate are interconnected with each other through the hollow portions of the perforated plate by a pressure.

Preferably, the perforated plate is made of at least one material selected from the group consisting of copper, brass, gold and silver.

In addition, the stainless steel plate is provided with a communicating portion thereto a clad member being inserted and fixed.

Further, there is provided a manufacturing process of a pot with a multi-layered bottom in accordance with one embodiment of the present invention, comprising: preparing a perforated plate, a stainless steel plate, an upper aluminum pate, a lower aluminum plate and a clad member into a size corresponding to the bottom of the pot; cutting the perforated plate, the stainless steel plate and the upper and the lower aluminum plates so that they have a predetermined height; washing the perforated plate, the stainless steel plate and the upper and the lower aluminum plates in order to remove oiliness and impurities thereon; forming a plurality of hollow portions in the perforated plate and forming a communicating portion in the stainless steel plate; fixing the upper aluminum plate to the upper side of the perforated plate by spot-welding; spot-welding the lower aluminum plate to the upper side of the stainless steel plate and spot-welding the clad member to the position corresponding to the communication portion of the stainless steel plate at the lower side of the spot-welded aluminum plate; spot-welding the upper aluminum plate to the bottom of the pot and then the lower aluminum plate to the perforated plate one after another; preheating the bottom of the pot temporally assembled; cladding the plates in their stacking order by pressing the bottom of preheated pot, thereby interconnecting the upper aluminum plate at the upper side of the perforated plate and the lower aluminum plate at the lower side of the perforated plate through the hollow portions of the perforated plate; polishing the outer surfaces of the pot in order to make them glossy.

In addition, there is provided another manufacturing process of a pot with a multi-layered bottom in accordance with one embodiment of the present invention, comprising: preparing a perforated plate, a stainless steel plate, an upper aluminum plate, a lower aluminum plate and a clad member into a size corresponding to the bottom of the pot; cutting the perforated plate, the stainless steel plate, the upper aluminum plate and the lower aluminum plate so that they have a predetermined height; washing the perforated plate, the stainless steel plate, the upper aluminum plate and the lower aluminum plate in order to remove oiliness and impurities thereon; forming a communicating portion on the stainless steel plate; stacking the upper aluminum plate, the perforated plate, the lower aluminum plate, the stainless steel plate and the clad member one after another on the bottom of the pot and depositing flux between these plates; fixing each of the plates on the bottom of the pot in the stacking order by heating the bottom of the pot and melting the flux; polishing the outer surfaces of the pot in order to make them glossy.

In accordance with the pot with a multi-layered bottom of the present invention, heat efficiency and heat conductivity are improved this cooking food in a short time. In addition, in a case that the perforated plate is made of a colored material, the product has a more pleasing appearance.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

A preferred embodiment of the present invention will now be described with reference to the accompanying drawings.

Figure 1:
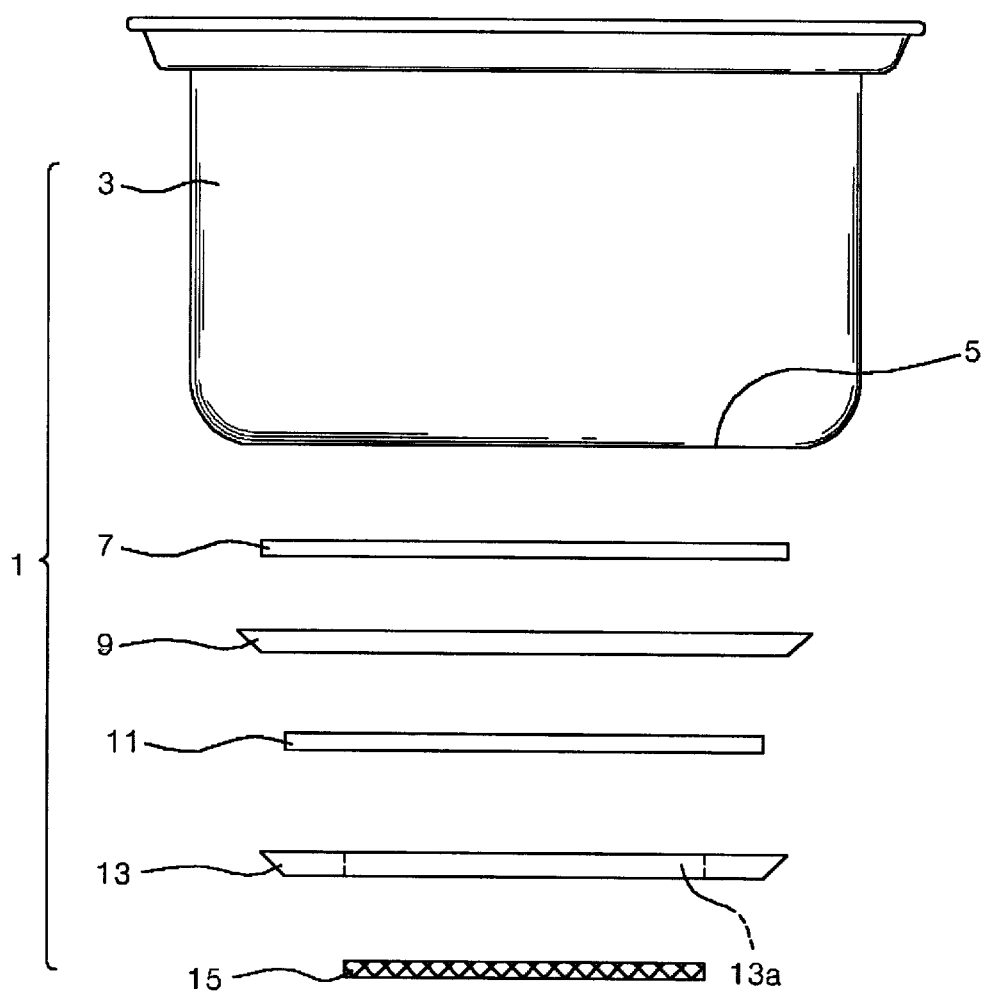
FIG. 1 is an expanded view of a pot with a five-layered bottom in accordance with an embodiment of the present invention.

As illustrated in FIG. 1, a pot 1 with a multi-layered bottom comprises a container portion 3 made of a stainless material and a base bottom 5 with a round shape as is generally the case in general cookware.

Although the material of the container portion 3 is stainless steel in accordance with the embodiment of the present invention, it is also possible to use other materials with heat conductivity and rigidity which have a pleasing appearance, such as aluminum, clad metal, etc.

An upper aluminum plate 7 is provided at the base bottom 5 as illustrated. The upper aluminum plate 7 is made of aluminum which has a melting point of 660 degrees, a silver white color, is easy to process with it's excellent diffusivity and compressibility, and has excellent heat conductivity.

Figure 2:
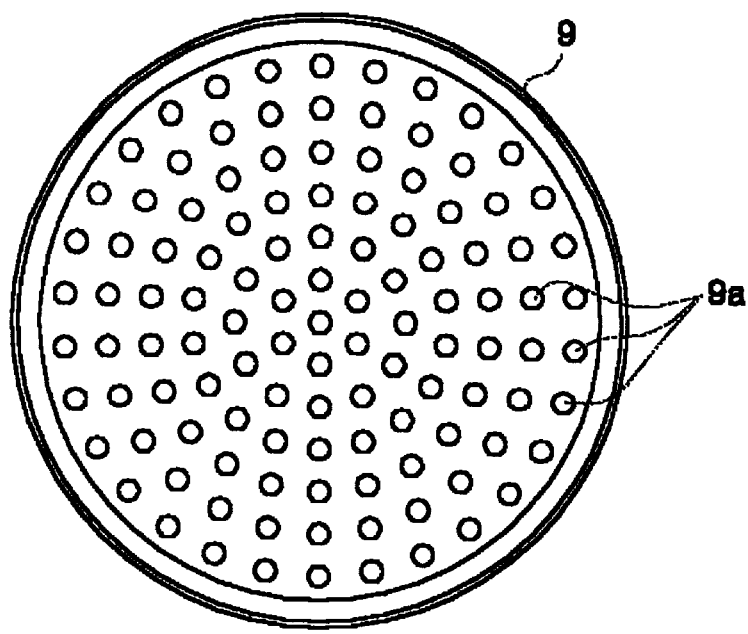
FIG. 2 is a plane view of a perforated plate in accordance with the embodiment of the present invention.

A perforated plate 9 of the shape as illustrated in FIG. 2 is provided below the upper aluminum plate 7 and they are in contact with each other.

As the material of the perforated plate 9 in accordance with the embodiment of the present invention, copper is used which has better heat and electric conductivities when compared to silver, has a red color and is easy to process at a high temperature and at an ambient temperature. However, cooper is merely the material chosen assist a comprehensive understanding of the embodiment of the invention. Thus, it is apparent that other materials with excellent heat conductivity such as brass, gold, silver, etc. can be used for the perforated plated 9.

The perforated plate 9 is formed with a plurality of hollow portions 9a in a shape of through-hole radiated from the center of a round plate. The shape and penetrating position of the hollow portions 9a are changeable.

In the pot with a structure of a five-layered bottom in accordance with the embodiment of the present invention, the perforated plate 9 may have a shape with no hollow portions 9a. In this case, the plates are interconnected by a pressure.

As illustrated in FIG. 1, a lower aluminum plate 11 is provided below the perforated plate 9 and is made of the same material as the upper aluminum plate 7. Below the lower aluminum plate 11, a stainless steel plate 13 is provided.

The stainless steel plate 13 is a kind of chrome steel with excellent heat conservativity and endurance, and is the main material constituting the outer appearance of the pot. In accordance with the embodiment of the present invention, a stainless steel containing magnetic properties is used as the material of the stainless steel plate 13, so the pot 1 with a multi-layered bottom can be used for halogen ranges and induction cookware as well as gas ranges.

However, it is apparent that a stainless steel containing no magnetic properties can be also employed as the material of the stainless steel plate 13 in accordance with the embodiment of the invention.

Figure 5:
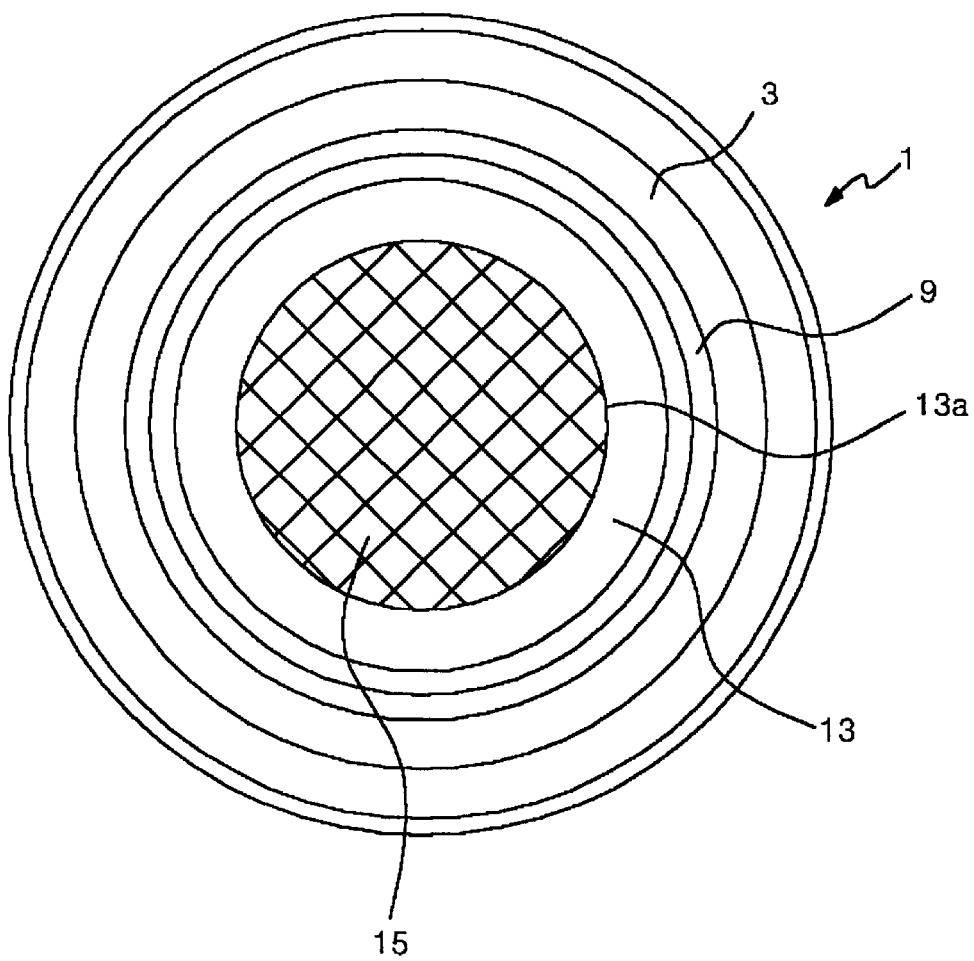
FIG. 5 is a bottom view showing a mounting state of a clad member in accordance with another embodiment of the present invention.

In accordance with another embodiment of the present invention, as illustrated in FIGS. 1 and 5, the stainless steel plate 13 is formed with a communicating portion 13a having a hollow shape at a predetermined portion. Below the communicating portion 13a, a clad member 15 with a slant shape is provided.

As illustrated in FIG. 5, the clad member 15 has a predetermined thickness and has a slant shape formed uniformly. Inside the slant shape, an air vent hole is formed.

Although the clad member 15 is made of copper in accordance with the embodiment of the present invention, it can be also made of other materials.

A manufacturing process of the thusly constituted pot 1 with a multi-layered bottom will now be described in accordance with the embodiment of the present invention.

Firstly, the upper and lower aluminum plates 7 and 11, perforated plate 9 and stainless steel plate 13 are processed so that the base bottom 5 can be clad with them. Then, a washing process for removing oiliness and impurities is carried out.

The washing process is carried out by a washing machine such as an ultrasonic washing machine. If the washing process is not performed properly, a process of cladding between the above plates may be problematic.

In addition, as illustrated in FIG. 2, the perforated plate 9 is processed so that the hollow portions 9a can be formed in a radial direction from the center of the round plate. As illustrated in FIG. 5, the stainless steel plate 13 is formed with a hollow, communicating portion 13a of a predetermined size at the center.

After the above processes, the upper and lower aluminum plates 7 and 11, perforated plate 9 and stainless steel plate 13 each are cut to have a predetermined height.

If the cutting process is not carried out, the cladding may not be performed well due to the uneven surfaces of the plates.

After the above process, the upper aluminum plate 7 and the perforated plate 9 are temporally assembled for trial by spot welding using a condenser welder. The reason why the condenser welder is used for the spot welding is because it is difficult to weld non iron metals using a typical welder.

As the condenser welder is well known in the art, those skilled in the art will understand that other types of welders for welding non iron metals may similarly be employed in accordance with the embodiment of the present invention.

In addition, the lower aluminum plate 11, stainless steel plate 13 and clad member 15 are spot welded one after another by the condenser welder and then are temporally assembled for trial.

Moreover, a temporal assembly of the upper aluminum plate 7 and perforated plate 9 is temporally assembled to the base bottom 5 of the container portion by spot welding so that they are stacked in the order as illustrated in FIG. 1. In this state, the lower aluminum plate 11, stainless steel plate 13 and clad member 15 are temporally assembled by spot welding.

By the above process, plates are stacked and temporally assembled below the base bottom 5 of the container portion in the order as illustrated in FIG. 1. The pot 1 with a five-layered bottom is fixed by inserting the container portion 3 into a lower mold 22 of a press 20 as illustrated in FIG. 3.

The fixed pot 1 with a five-layered bottom is heated by an induction heater within the range of 450 degrees and 600 degrees. Thusly, the upper aluminum plate 7 and the lower aluminum plate 11 become ductile.

Figure 3:
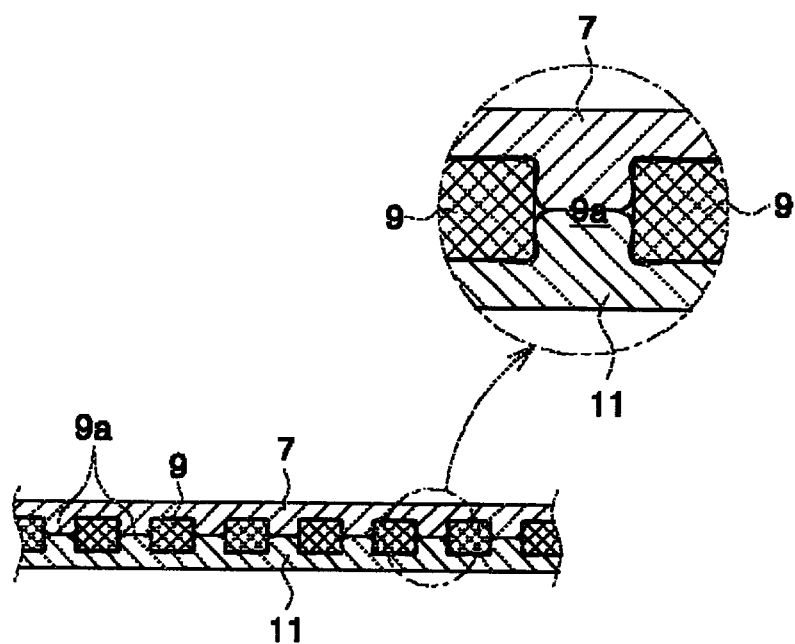
FIG. 3 is a plane view showing a process of pressurizing the pot with a five-layered bottom in accordance with the embodiment of the present invention.
Figure 4:
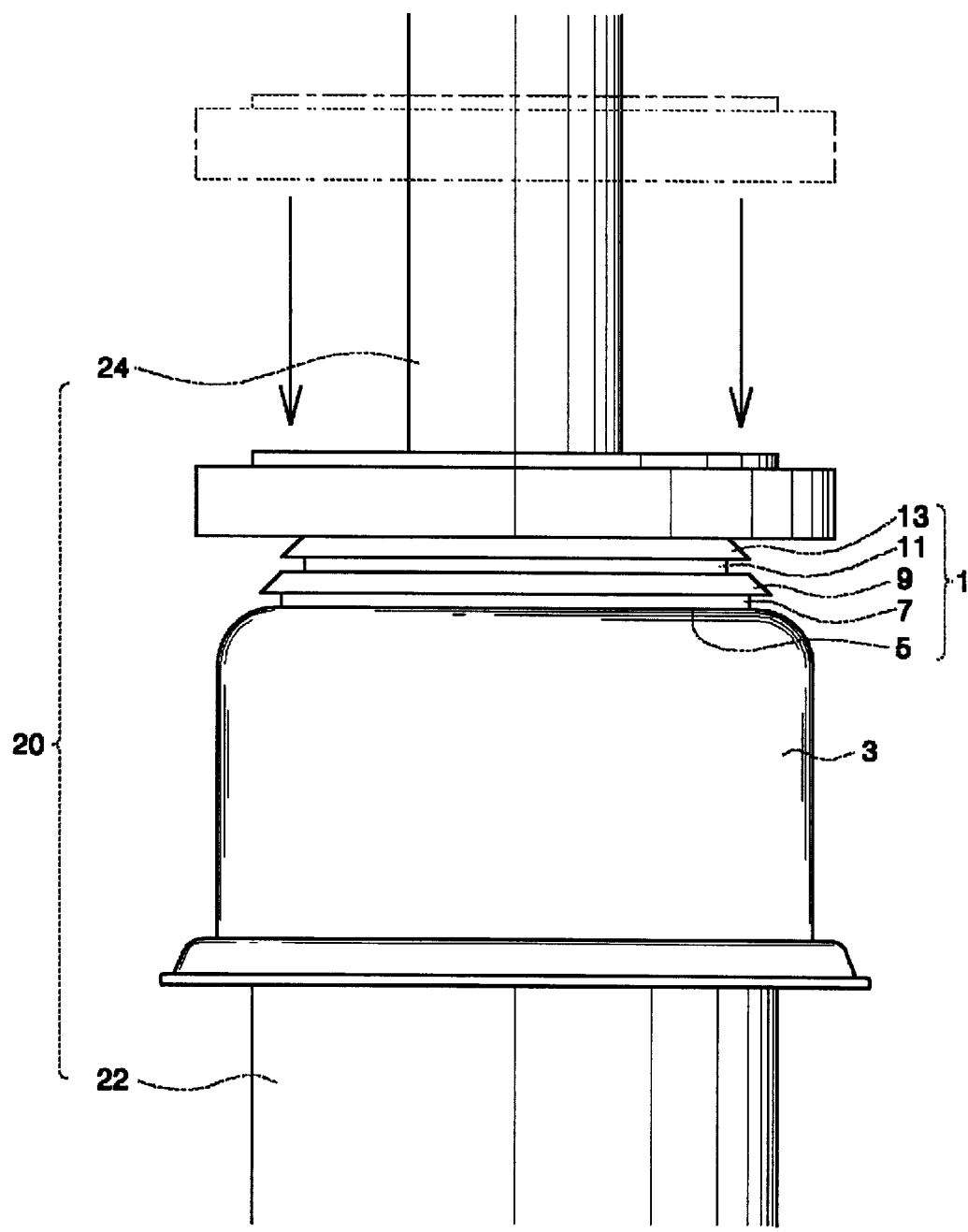
FIG. 4 is a partially enlarged view showing a connection state between the perforated plate and an aluminum plate in accordance with the embodiment of the present invention.

In this state, an upper mold 24 of the press 20 presses the base bottom 5 of the pot 1 with a five-layered bottom as illustrated in FIG. 3 with a pressure between 1000 tons and 2000 tons.

By the above operation, the upper aluminum plate 7 and the lower aluminum plate 11 are pressed in order to be contacted with adjacent members.

Particularly, the perforated plate 9 and the upper and lower aluminum plates are connected in such a manner that the corresponding portion of the upper aluminum plate 7 is inserted into the upper side of the hollow portion 9a of the perforated plate 9 and the corresponding portion of the lower aluminum plate 11 is inserted into the lower side of the hollow portion 9a.

The upper aluminum plate 7 and lower aluminum plate 11 inserted into the hollow portion 9a are connected with each other, thus allowing the upper aluminum plate 7, perforated plate 9 and lower aluminum plate 11 to form a firm connected structure.

In addition, the clad member 15 is inserted into the lower side of the lower aluminum plate 11 by pressure, and thusly the clad member 13, the lower aluminum plate 11 and the stainless steel plate 13 are disposed on the same plane in view of the bottom surfaces.

In accordance with another embodiment of the present invention, only aluminum plate contacting the perforated plate 9 is provided. In this case, the perforated plate 9 has only a connection force for inserting and fixing the corresponding portion of the aluminum plate 9 to the hollow portion 9a.

After the pressing process by the press 20, the pot 1 with a multi-layered bottom is polished so that it's surfaces become glossy, a handle and accessories are then attached, thereby completing a product.

In another embodiment of the manufacturing process of the invention, the five-layered bottom can be clad by a pressure of the press 20. In another embodiment, a braising cladding method by high-frequency heating can be employed by using solvent such as powder and flax.

More specifically, in the manufacturing process in accordance with the embodiment of the present invention, the hollow portions 9a are formed at the perforated plate 9 and the corresponding embossed portion is formed at the upper aluminum plate 7 and the lower aluminum plate 11, respectively.

In addition, the upper aluminum plate 7, the perforated plate 9, the lower aluminum plate 11, the stainless steel plate 13 and the clad member 15 are stacked in turns. At this time, a flux is deposited between those members.

When heat is applied to the flux, each of the members are clad with one another. In this case, the upper and lower aluminum plates 7 and 11 are inserted into the hollow portions 9a of the perforated plate 9 and are thus interconnected.

Meanwhile, in another embodiment where the upper aluminum plate 7, the lower aluminum plate 11 and the perforated plate 9 are simply formed in a round shape, the plates constituting the five-layered bottom are interconnected by a braising welding method in which heat is applied to the flux.

In the above embodiment of the present invention, by employing the perforated plate 9 made of material superior to aluminum, heat conductivity and heat efficiency are increased to thus may cook feed in a short time, and heat variation is reduced to thus not scorching food in the container portion 3 and preventing food from becoming stuck on the base bottoms.

In addition, the aluminum plates are inserted into the upper and lower sides respectively of the hollow portion 9a of the perforated plate 9 and are connected in the hollow portion 9a to make the connection force stronger, thus improving the reliability of the product.

Moreover, in the conventional art, the bottom of the container portion 3 is made of aluminum and stainless steel, giving the product has a gray-white color. However, if copper is employed in accordance with embodiment of the present invention, a red color is added thus making the product more aesthetically pleasing.

Furthermore, with respect to the container portion 3, the clad member is inserted into the lower aluminum plate 11 contacting the stainless steel plate 13 thus serving as a heating coil, thereby obtaining a product with excellent heat conductivity and heat conservativity.

The technical conception of the present invention is that ductile materials such as aluminum are provided at the upper and lower sides of the perforated plate 9 having the hollow portion 9a and the ductile materials meet on the hollow portion 9a and are interconnected to thus generate a connection force. In such a technical conception, it is apparent that the deposition position between materials and plates and the like can be varied.

As described above, according to the pot with a multi-layered bottom of the present invention, heat conductivity and heat conservativity are increased to cook foods in a short time and to prevent foods from becoming scorched and stuck.

In addition, a structure in which the aluminum plates are inserted respectively into the upper and lower sides of the hollow portion of the perforated plate, the connection force between the plates materials becomes stronger, thereby improving the reliability of the product.

Moreover, when copper or gold with high heat conductivity is used as the material of the perforated plate, the product looks better and thus it becomes more aesthetic.

Furthermore, the clad member is inserted into the lower aluminum plate to thus serve as a heating coil, thereby improving heat conductivity and heat conservativity.

What is claimed is:

1. A pot with a multi-layered bottom made of a stack of different materials, the pot comprising:
    an upper aluminum plate being fixed to the bottom of the pot in contact with each other;
    a perforated plate being fixed to the lower side of the upper aluminum plate and having a plurality of hollow portions;

a lower aluminum plate being fixed to the lower side of the perforated plate; and a stainless steel plate being fixed to the lower side of the lower aluminum plate;

wherein the upper aluminum plate and lower aluminum plate are interconnected with each other through the hollow portions of the perforated plate by a pressure.

2. The pot of claim 1 wherein the perforated plate is made of at least one material selected from the group consisting of copper, brass, gold and silver.

3. The pot of claim 1 wherein the stainless steel plate is provided with a communicating portion thereto a clad member being inserted and fixed.

* * * * *